(12) United States Patent
Kyte et al.

(10) Patent No.: US 10,948,125 B2
(45) Date of Patent: Mar. 16, 2021

(54) MONOPODIC SURFACE PREPARATION APPARATUSES AND METHODS OF OPERATING THE SAME

(71) Applicant: The Boeing Company, Chicago, IL (US)

(72) Inventors: Kadon A. Kyte, Charleston, SC (US); Jason A. Kerestes, Charleston, SC (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 16/378,946

(22) Filed: Apr. 9, 2019

(65) Prior Publication Data

US 2020/0326033 A1  Oct. 15, 2020

(51) Int. Cl.

| F16M 11/28 | (2006.01) |
|---|---|
| F16M 11/10 | (2006.01) |
| F16M 13/00 | (2006.01) |
| B66F 3/24 | (2006.01) |
| B24B 23/02 | (2006.01) |

(52) U.S. Cl.
CPC ............ *F16M 11/28* (2013.01); *B66F 3/247* (2013.01); *B24B 23/02* (2013.01); *F16M 11/10* (2013.01); *F16M 2200/02* (2013.01); *F16M 2200/08* (2013.01)

(58) Field of Classification Search
CPC ............... F16M 11/28; F16M 2200/02; F16M 2200/08; B66F 3/247; B24B 23/02; B24B 1/01

USPC ....... 451/358, 177, 246, 294, 295, 360, 557, 451/24, 524
See application file for complete search history.

(56) References Cited

U.S. PATENT DOCUMENTS

| 2,753,669 | A | * | 7/1956 | Larson | .................... | B24B 7/184 |
|---|---|---|---|---|---|---|
| | | | | | | 451/524 |
| 4,204,292 | A | * | 5/1980 | Lester | .................... | A46B 5/005 |
| | | | | | | 15/144.4 |
| 4,870,730 | A | * | 10/1989 | Belknap | .................. | B24B 7/184 |
| | | | | | | 29/26 A |

(Continued)

OTHER PUBLICATIONS https://www.ergonomicpartners.com/zero-gravity-tool-balancer (2019).

*Primary Examiner* — Tan Le
(74) *Attorney, Agent, or Firm* — Walters & Wasylyna LLC

(57) ABSTRACT

A monopodic surface preparation apparatus includes a linear actuator and a base coupled to the linear actuator. The linear actuator is pivotally moveable relative to the base when the linear actuator is in an extended position. A lock restricts pivotal movement of the linear actuator when the linear actuator is in a retracted position. A rotary surface preparation tool is coupled to the linear actuator. The rotary surface preparation tool is linearly moveable using the linear actuator and is pivotally moveable relative to the linear actuator. A control handle is coupled to the linear actuator to pivot the linear actuator relative to the base when the linear actuator is in the extended position. An actuator-controller is coupled to the control handle and configured to selectively actuate the linear actuator. A tool-controller is coupled to the control handle and configured to selectively energize the rotary surface preparation tool.

20 Claims, 11 Drawing Sheets

(56) References Cited

U.S. PATENT DOCUMENTS

| | | | | |
|---|---|---|---|---|
| 5,540,172 | A * | 7/1996 | Goldbach | B63B 59/10 |
| | | | | 114/222 |
| 6,189,473 | B1 * | 2/2001 | Appel | B05B 13/005 |
| | | | | 114/222 |
| 7,074,111 | B2 * | 7/2006 | Cecil | B24B 7/182 |
| | | | | 451/24 |
| 9,534,730 | B2 | 1/2017 | Black et al. | |
| 2017/0307132 | A1 | 10/2017 | Kerestes | |

* cited by examiner

MONOPODIC SURFACE PREPARATION APPARATUSES AND METHODS OF OPERATING THE SAME

FIELD

The present disclosure is generally related to surface preparation and, more particularly, to monopodic surface preparation apparatuses and methods of operating the same for preparing an overhead surface.

BACKGROUND

Various types of rotary surface preparation tools are used to prepare a surface for a particular application. Examples of such rotary surface preparation tools include rotary sanders, rotary grinders, and rotary polishers. A known application of a rotary surface preparation tool is preparing an overhead surface, such as an underwing structure of an aircraft. Overhead surface preparation poses a number of ergonomic challenges for a person operating the surface preparation tool. Accordingly, those skilled in the art continue with research and development efforts in the field of overhead surface preparation and, as such, apparatuses and methods intended to address the above-identified concerns, would find utility.

SUMMARY

The following is a non-exhaustive list of examples, which may or may not be claimed, of the subject matter according to the present disclosure.

In an example, a disclosed monopodic surface preparation apparatus includes a linear actuator including a tool-end and a base-end. The linear actuator is moveable between a retracted position and an extended position. The monopodic surface preparation apparatus also includes a base coupled to the base-end of the linear actuator. The linear actuator is pivotally moveable relative to the base when the linear actuator is in the extended position. The monopodic surface preparation apparatus further includes a lock configured to restrict pivotal movement of the linear actuator relative to the base when the linear actuator is in the retracted position. The monopodic surface preparation apparatus additionally includes a rotary surface preparation tool coupled to the tool-end of the linear actuator. The rotary surface preparation tool is linearly moveable using the linear actuator and is pivotally moveable relative to the linear actuator. The monopodic surface preparation apparatus also includes a control handle coupled to the linear actuator and configured to pivot the linear actuator relative to the base when the linear actuator is in the extended position. The monopodic surface preparation apparatus further includes an actuator-controller coupled to the control handle and configured to selectively actuate the linear actuator. The monopodic surface preparation apparatus additionally includes a tool-controller coupled to the control handle and configured to selectively energize the rotary surface preparation tool.

In an example, a disclosed monopodic surface preparation apparatus includes a linear actuator including a tool-end and a base-end. The linear actuator is moveable between a retracted position and an extended position. The monopodic surface preparation apparatus also includes a base coupled to the base-end of the linear actuator. The base is configured to support the linear actuator and the linear actuator is pivotally moveable relative to the base when the linear actuator is in the extended position. The monopodic surface preparation apparatus further includes a tool mount coupled to the tool-end of the linear actuator. A rotary surface preparation tool is coupleable to the tool mount. The monopodic surface preparation apparatus additionally includes a lock configured to restrict pivotal movement of the linear actuator relative to the base when the linear actuator is in the retracted position. The monopodic surface preparation apparatus also includes a control handle coupled to the linear actuator and configured to pivot the linear actuator relative to the base when the linear actuator is in the extended position. The monopodic surface preparation apparatus further includes an actuator-controller coupled to the control handle and operatively coupled to the linear actuator. The actuator-controller is configured to selectively actuate the linear actuator. The monopodic surface preparation apparatus additionally includes a tool-controller coupled to the control handle and operatively coupleable to the rotary surface preparation tool. The tool-controller is configured to selectively energize the rotary surface preparation tool.

In an example, a disclosed method of preparing an overhead-surface using a monopodic surface preparation apparatus includes steps of: (1) supporting a linear actuator of the monopodic surface preparation apparatus on a support-surface using a base coupled to a base-end of the linear actuator; (2) moving the linear actuator from a retracted position to an extended position using an actuator-controller; (3) contacting a rotary surface preparation tool, coupled to a tool-end of the linear actuator, against the overhead-surface; (4) with linear actuator in the extended position and the rotary surface preparation tool in contact with the overhead-surface, energizing the rotary surface preparation tool using a tool-controller; (5) with linear actuator in the extended position and the rotary surface preparation tool in contact with the overhead-surface, pivotally moving the linear actuator relative to the base using a control handle; (6) de-energizing the rotary surface preparation tool using the tool-controller; (7) moving the linear actuator from the extended position to the retracted position using the actuator-controller; and (8) with linear actuator in the retracted position, restricting pivotal movement of the linear actuator relative to the base using a lock.

Other examples of the disclosed plug gauge and method will become apparent from the following detailed description, the accompanying drawings and the appended claims.

DETAILED DESCRIPTION

Figure 1:
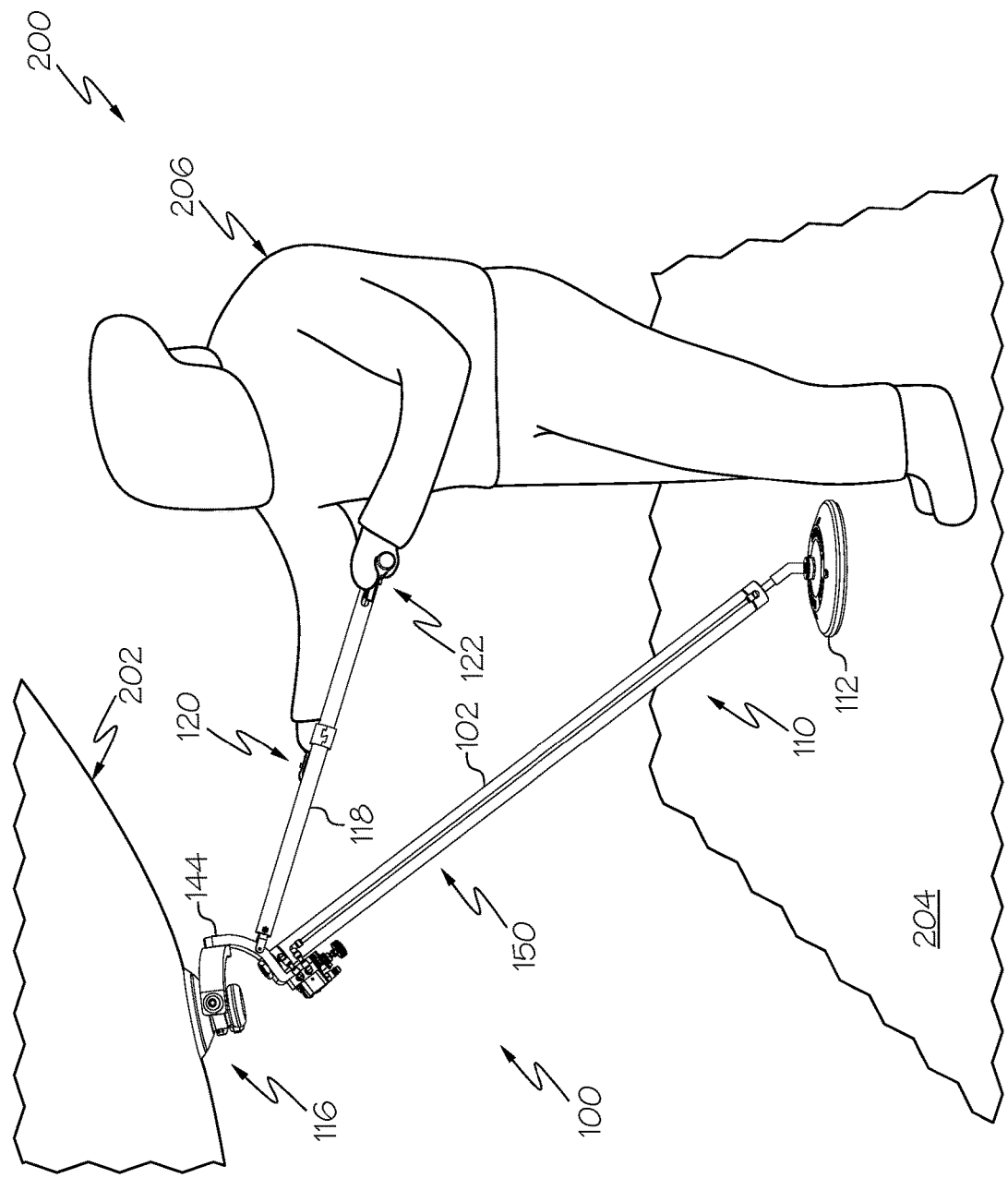
FIG. 1 is a schematic, environmental view of an example of a disclosed monopodic surface preparation apparatus in use during a surface preparation operation.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-12, by way of examples, the present disclosure describes monopodic surface preparation apparatuses and methods of operating the same. More specifically, the present disclosure describes monopod support devices for rotary surface preparation tools capable of single-handed actuation to raise and lower an associated rotary surface preparation tool during an overhead surface preparation operation. The implementations described herein may relate to surface preparation of an underwing structure of an aircraft. More specifically, the monopodic surface preparation apparatuses and methods of operating the same may be implemented by an original equipment manufacturer (OEM) for assembling airplane structures in compliance with military and space regulations.

Figure 2:
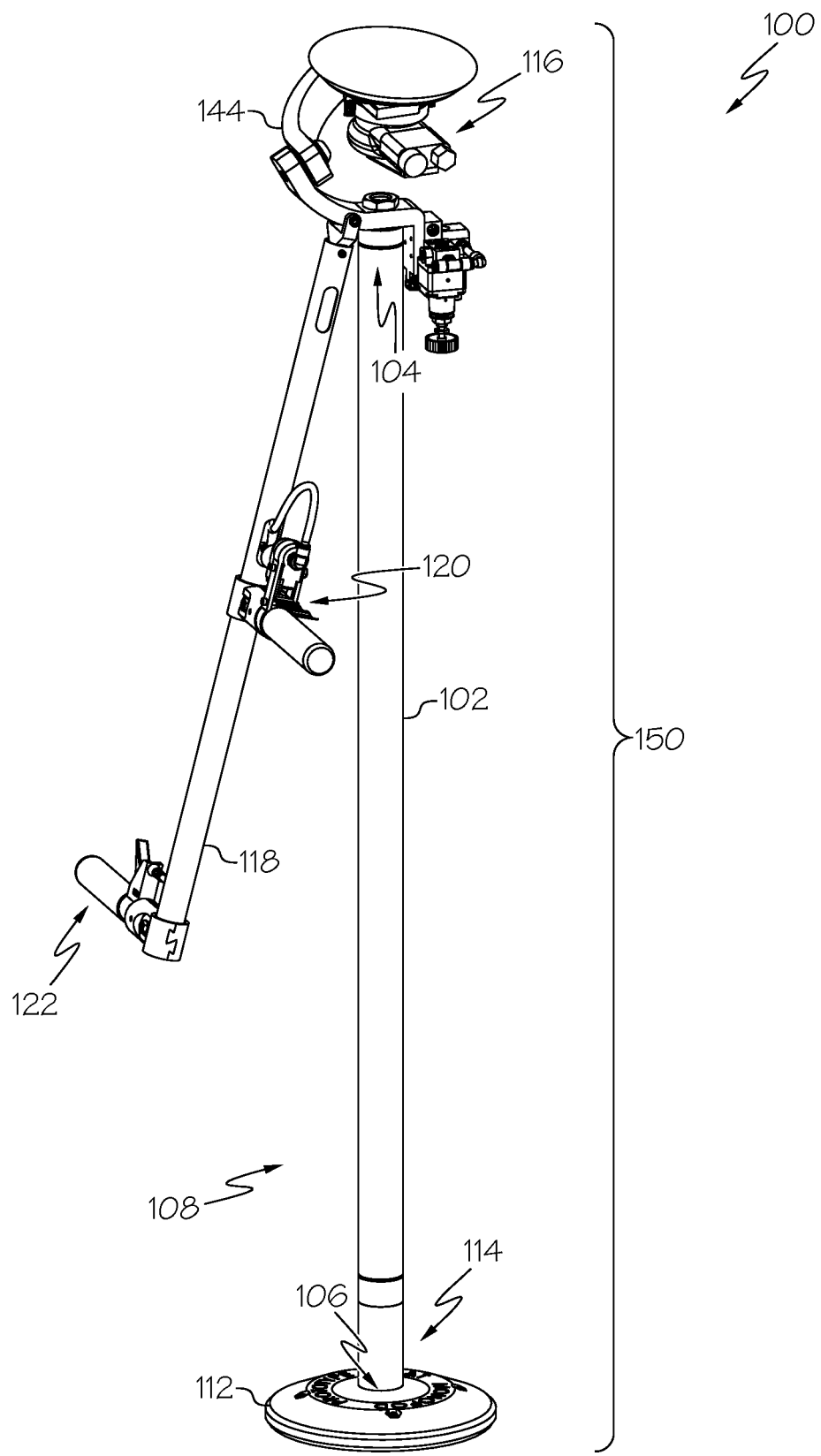
FIG. 2 is a schematic, perspective view of an example of the monopodic surface preparation apparatus.

Referring to FIGS. 1-11, examples of a monopodic surface preparation apparatus 100 are disclosed. As illustrated in FIGS. 1 and 2, the monopodic surface preparation apparatus 100 includes a monopod support device 150. The monopod support device 150 is configured to support a rotary surface preparation tool 116 and to move the rotary surface preparation tool 116 into contact with an overhead-surface 202 (FIG. 1), such as an underwing structure of an aircraft, during a surface preparation operation.

Generally, by way of the illustrative examples, the disclosed monopodic surface preparation apparatus 100 is pneumatically powered. However, the disclosed monopodic surface preparation apparatus 100 is not necessary limited to pneumatic power. In other examples, where appropriate, pneumatic components may be replaced or interchanged with electro-mechanical or hydraulic components. It should be appreciated that some components, such as some pneumatic components, of the monopodic surface preparation apparatus 100 may be omitted in FIGS. 1-4, 8, and 10.

In one or more examples, the monopodic surface preparation apparatus 100 includes the rotary surface preparation tool 116 that is coupled to the monopod support device 150. In one or more examples of the monopodic surface preparation apparatus 100, the rotary surface preparation tool 116 is coupleable (e.g., is configured to be coupled to or is capable of being coupled to) the monopod support device 150.

Figure 3:
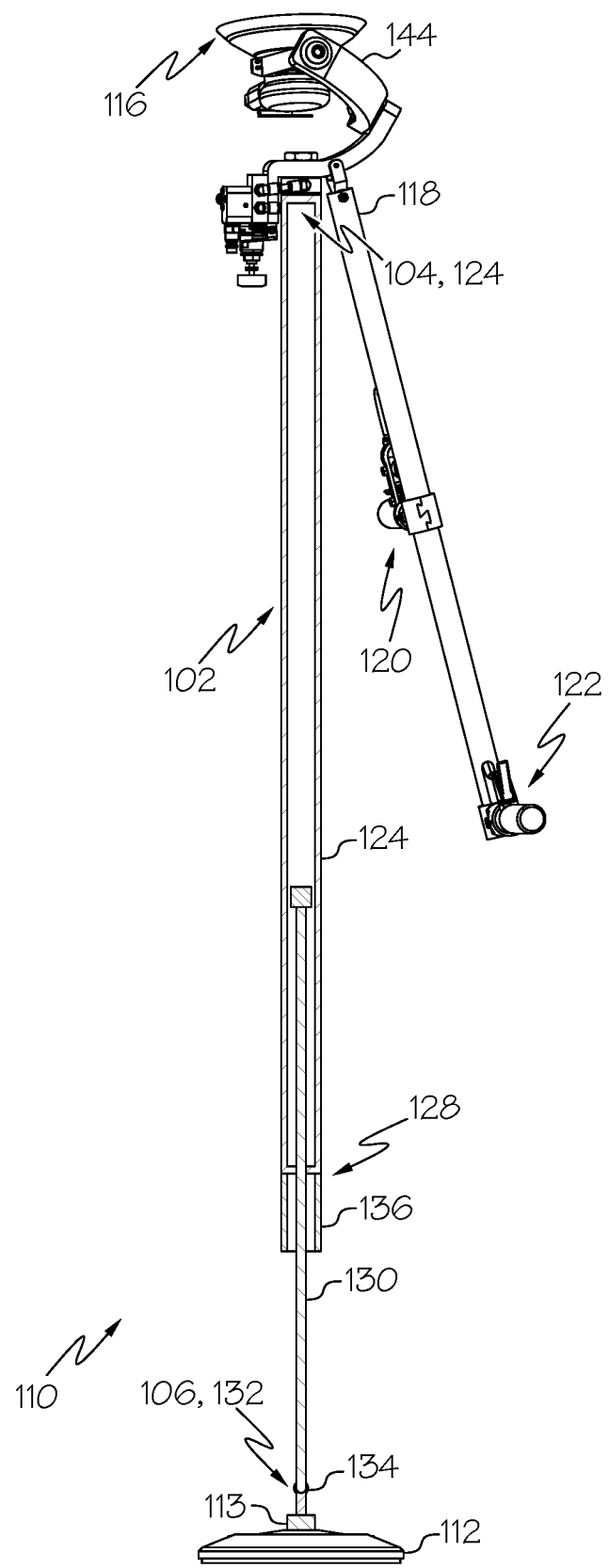
FIG. 3 is a schematic, elevation, partial sectional view of an example of the monopodic surface preparation apparatus in an extended position.

Referring to FIGS. 1-4, in an example, monopodic surface preparation apparatus 100 includes a linear actuator 102. The linear actuator 102 includes a tool-end 104 and a base-end 106, opposite the tool-end 104. The linear actuator 102 is moveable between a retracted position 108 (FIGS. 2 and 4) and an extended position 110 (FIGS. 1 and 3).

Figure 11:
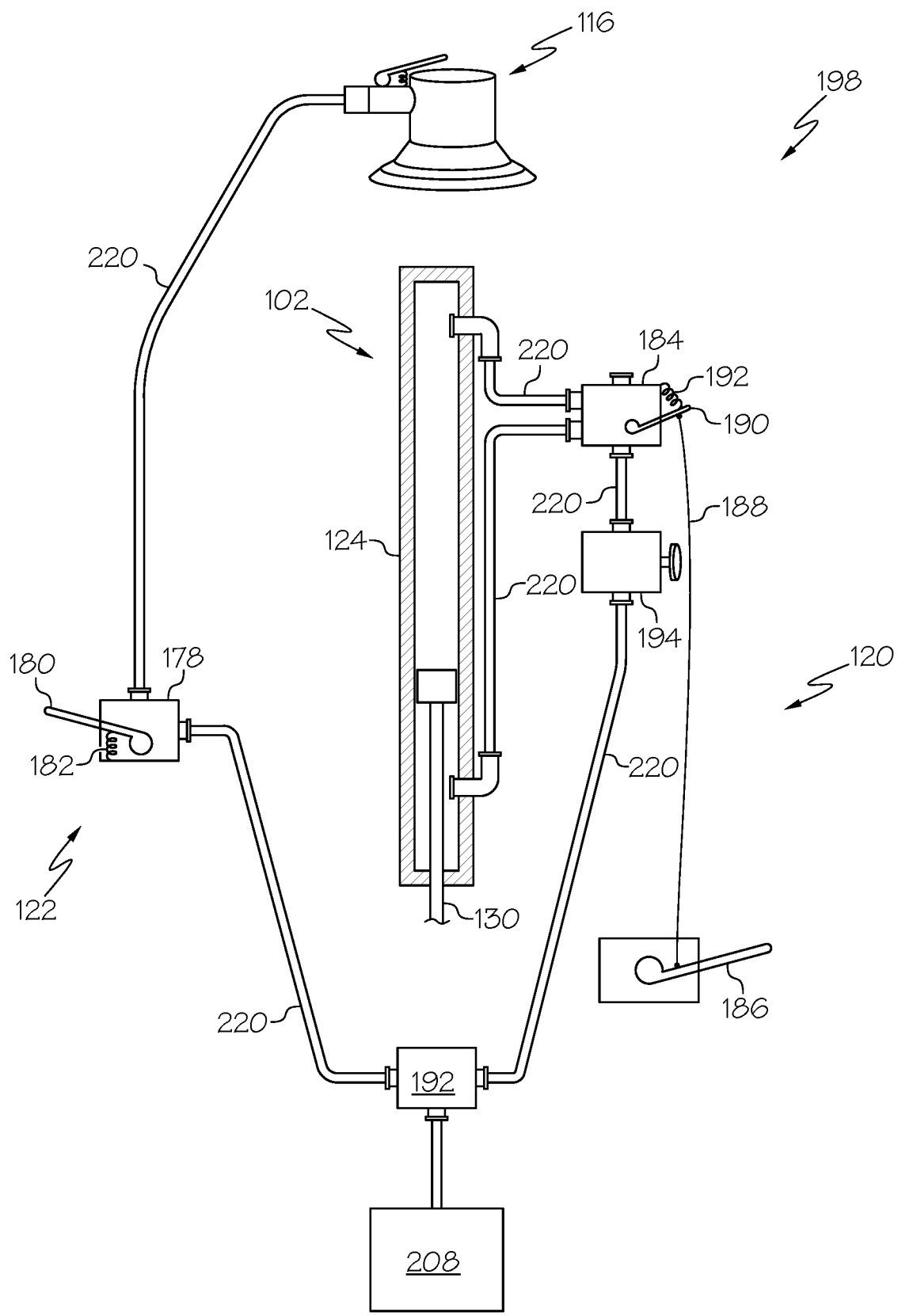
FIG. 11 is a schematic illustration of an example of a controls system of the monopodic surface preparation apparatus.

The linear actuator 102 includes any one of various types of automatic actuators that create motion in a straight line and is capable of being driven by any one of a variety of energy sources. In an example, the linear actuator 102 is a pneumatic actuator that is powered by application of pressurized air from a compressed air source 208 (FIG. 11). In another example, the linear actuator 102 is a mechanical or electro-mechanical actuator that is powered by application of electricity from a power supply. In another example, the linear actuator 102 is hydraulic actuator that is powered by application of pressurized liquid from a compressed liquid source. A pneumatically powered linear actuator 102 may be particularly advantageous in certain manufacturing environments where electrical or mechanical components are undesirable.

Referring to FIGS. 1-4, in an example, the monopodic surface preparation apparatus 100 also includes a base 112. The base 112 is coupled to the base-end 106 of the linear actuator 102. The base 112 is configured to support the linear actuator 102. For example, the base 112 is configured to support the linear actuator 102 on a support-surface 204, such as a work floor of a manufacturing environment 200 (FIG. 1). The linear actuator 102 is pivotally moveable relative to the base 112 when the linear actuator 102 is in the extended position 110 (FIGS. 1 and 3). As illustrated in FIG. 1, pivotal movement of the linear actuator 102 relative to the base 112 moves the rotary surface preparation tool 116 laterally across the overhead-surface 202.

Referring to FIGS. 1-4, in an example, the monopodic surface preparation apparatus 100 includes a base 112 also includes a lock 114. The lock 114 is configured to restrict pivotal movement of the linear actuator 102 relative to the base 112 when the linear actuator 102 is in the retracted position 108.

Referring to FIGS. 1-4, in an example, the monopodic surface preparation apparatus 100 includes the rotary surface preparation tool 116. In an example, the rotary surface preparation tool 116 is coupled to (or is coupleable to) the tool-end 104 of the linear actuator 102. The rotary surface preparation tool 116 is linearly moveable using the linear actuator 102 and is pivotally moveable relative to the linear actuator 102. For example, the rotary surface preparation tool 116 is linearly moveable (e.g., raised and lowered) into contact with the overhead-surface 202 (FIG. 1) using the linear actuator 102. In an example, the rotary surface preparation tool 116 is pivotally moveable relative to the linear actuator 102.

The rotary surface preparation tool 116 includes any one of various different rotary tools configured to perform one or more surface preparing or surface finishing operations. In an example, the rotary surface preparation tool 116 includes, or takes the form of, a rotary sander used to perform a sanding operation on the overhead-surface 202 (FIG. 1). In another example, the rotary surface preparation tool 116 includes, or takes the form of, a rotary polisher used to perform a polishing operation on the overhead-surface 202. In another example, the rotary surface preparation tool 116 includes, or takes the form of, a rotary grinder used to perform a grinding operation on the overhead-surface 202.

The rotary surface preparation tool 116 includes any one of various types of automatic (e.g., "power") tools and is capable of being powered by any one of a variety of energy sources. In an example, the rotary surface preparation tool 116 is a pneumatic power tool that is powered by application of pressurized air from a compressed air source 208 (FIG. 11). In another example, the rotary surface preparation tool 116 is an electric power tool that is powered by application of electricity from a power supply. A pneumatically powered rotary surface preparation tool 116 may be particularly advantageous in certain manufacturing environments where electrical or mechanical components are undesirable. Further, when both the rotary surface preparation tool 116 and the linear actuator 102 are pneumatically powered, a shared, or common, compressed air source 208 may be used.

Referring to FIGS. 1-4, in an example, the monopodic surface preparation apparatus 100 includes a control handle 118. The control handle 118 is coupled to the linear actuator 102. The control handle 118 is configured to pivot the linear actuator 102 relative to the base 112 when the linear actuator 102 is in the extended position 110. For example, the control handle 118 is configured to enable an operator 206 (FIG. 1) to manually pivot the linear actuator 102 relative to the base 112 when the linear actuator 102 is in the extended position 110. In an example, the control handle 118 is pivotally moveable relative to the linear actuator 102 such that the control handle 118 can be raised and lowered by the operator 206 during use of the monopodic surface preparation apparatus 100.

Referring to FIGS. 1-4, in an example, the monopodic surface preparation apparatus 100 includes an actuator-controller 120. The actuator-controller 120 is coupled to the control handle 118. The actuator-controller 120 is configured to selectively actuate the linear actuator 102.

Referring to FIGS. 1-4, in an example, the monopodic surface preparation apparatus 100 includes a tool-controller 122. The tool-controller 122 is coupled to the control handle 118. The tool-controller 122 is configured to selectively energize the rotary surface preparation tool 116.

Figure 4:
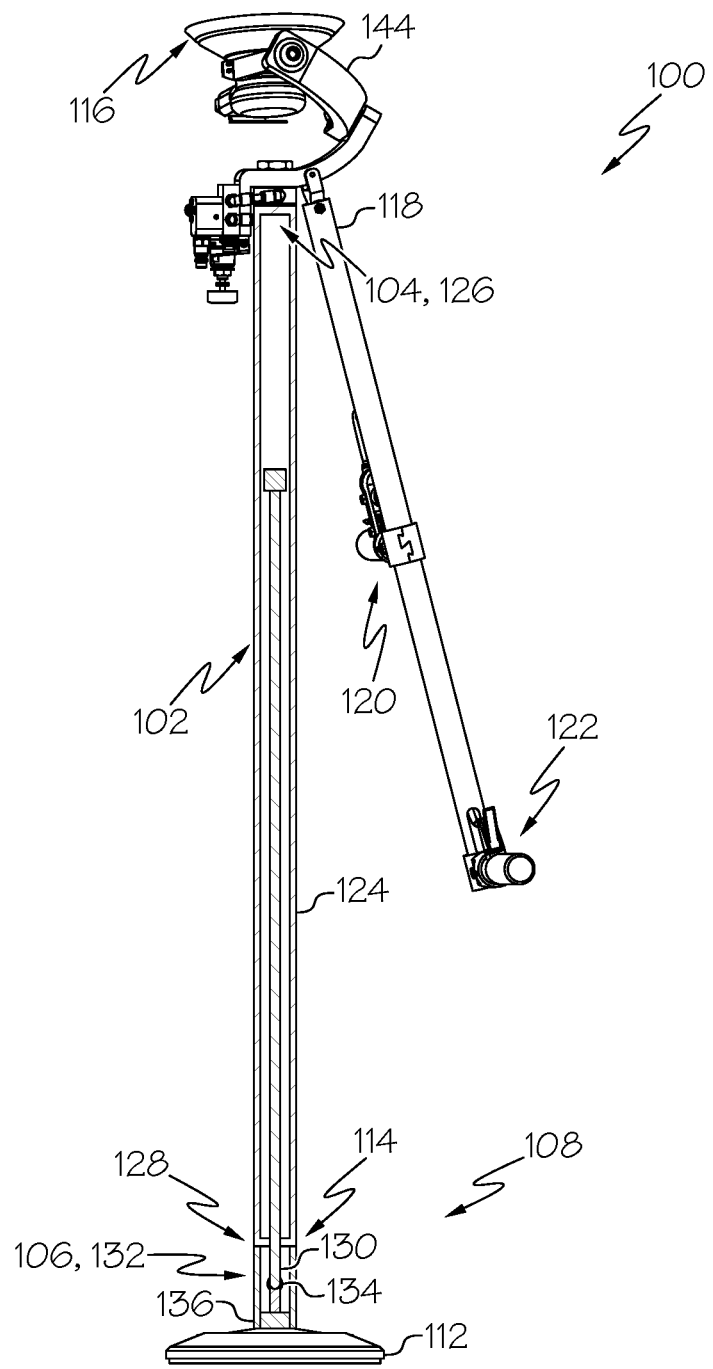
FIG. 4 is a schematic, elevation, partial sectional view of an example of the monopocis surface preparation apparatus in a retracted position.

Referring to FIGS. 3 and 4, in an example, the linear actuator 102 includes a cylinder 124. The cylinder 124 includes a cap-end 126 and a rod-end 128, opposite the cap-end 126. The cap-end 126 of the cylinder 124 defines the tool-end 104 of the linear actuator 102. The linear actuator 102 also includes a rod 130 extending from the rod-end 128 of the cylinder 124. The rod 130 includes a working-end 132. The working-end 132 of the rod 130 defines the base-end 106 of the linear actuator 102. The rod 130 is moveable relative to the cylinder 124 between the retracted position 108 and the extended position 110.

As used herein, the terms "retracted position" and the "extended position" may refer, generally, to the operating positions of the linear actuator 102 and, particularly, to the operating positions of the rod 130 (e.g., the working-end 132 of the rod 130) relative to the cylinder 124. The term "retracted position" refers to a fully retracted position of the linear actuator 102 in which the rod 130 is fully retracted relative to the cylinder 124. The term "extended position" refers to any position other than the retracted position, such as a partially extended position or fully extended position of the linear actuator 102 in which the rod 130 is extended at least some distance relative to the cylinder 124.

As illustrated in FIGS. 3 and 4, in an example, the base 112 is coupled to the working-end 132 of the rod 130. The rod 130 is pivotally moveable relative to the base 112 when the rod 130 is in the extended position 110 (FIG. 3). The rotary surface preparation tool 116 is coupled to the cap-end 126 of the cylinder 124. The rotary surface preparation tool 116 is pivotally moveable relative to the cylinder 124. The rotary surface preparation tool 116 is linearly moveable into contact with the overhead-surface 202 when the rod 130 is moved into the extended position 110.

Referring to FIGS. 3 and 5-7, in an example, the monopodic surface preparation apparatus 100 includes a joint 134. The joint 134 is coupled to the base-end 106 of the linear actuator 102 and to the base 112. The joint 134 enables the linear actuator 102 to pivotally move relative to the base 112. In other words, the joint 134 pivotally couples the linear actuator 102 and the base 112 together.

As illustrated in FIGS. 3 and 5-7, in an example, the joint 134 is coupled to the working-end 132 of the rod 130. The base 112 includes a post 113. The post 113 extends outwardly from a top surface of the base 112. The joint 134 is also coupled to an end of the post 113. The joint 134 enables the rod 130 to pivotally move relative to the post 113. In other words, the joint 134 pivotally coupled the rod 130 and the base 112 (e.g., the post 113) together.

In an example, the joint 134 includes, or takes the form of a U-joint. The U-joint enables pivotal movement of the linear actuator 102 relative to the base 112 about a transverse axis that is perpendicular to a longitudinal (or central) axis of the linear actuator 102. In another example, the joint 134 includes, or takes the form of a ball joint. The ball joint enables pivotal movement of the linear actuator 102 relative to the base 112 about any number of transverse axes that are perpendicular to the longitudinal axis of the linear actuator 102. The ball joint also enables rotational movement of the linear actuator 102 relative to the base 112 about the longitudinal axis of the linear actuator 102. In other examples, the joint 134 includes, or takes the form of, any one of various other suitable types of joints that enable the linear actuator 102 to pivot relative to the base 112.

Referring to FIGS. 3-7, in an example, the lock 114 includes a sleeve 136 coupled to the linear actuator 102. In an example, the sleeve 136 is coupled to the cylinder 124 and extends from the rod-end 128 of the cylinder 124 along the longitudinal axis of the linear actuator 102. In another example, the sleeve 136 surrounds the cylinder 124 (e.g., the linear actuator 102 is located within the elongated sleeve 136) and a portion of the sleeve 136 extends from the rod-end 128 of the cylinder 124 along the longitudinal axis of the linear actuator 102. The joint 134 is received within the sleeve 136 when the linear actuator 102 is in the retracted position 108 (FIGS. 4-7). As illustrated in FIG. 4, with the linear actuator 102 in the retracted position 108, the sleeve 136 restricts articulation of the joint 134. As illustrated in FIG. 3, with the linear actuator 102 in the extended position 110, the joint 134 is located outside of the sleeve 136, thereby enabling free articulation of the joint 134.

Figure 5:
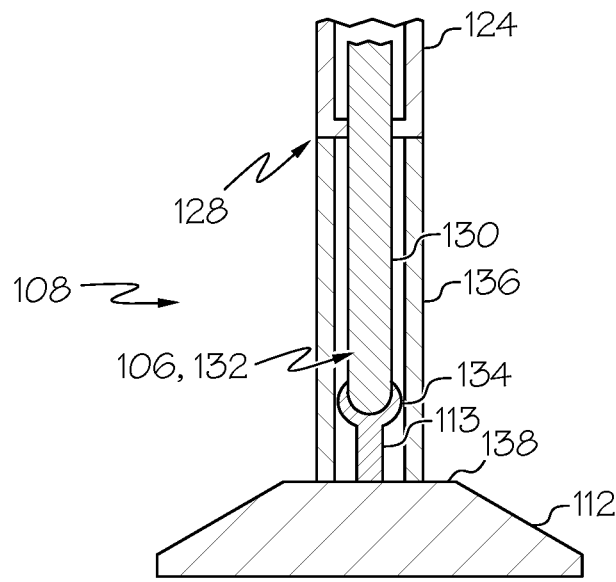
FIG. 5 is a schematic, elevation, sectional view of an example of portion of the monopodic surface preparation apparatus.
Figure 6:
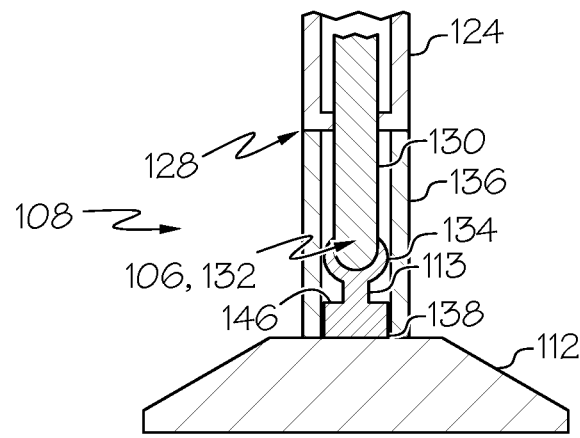
FIG. 6 is a schematic, elevation, sectional view of an example of portion of the monopodic surface preparation apparatus.
Figure 7:
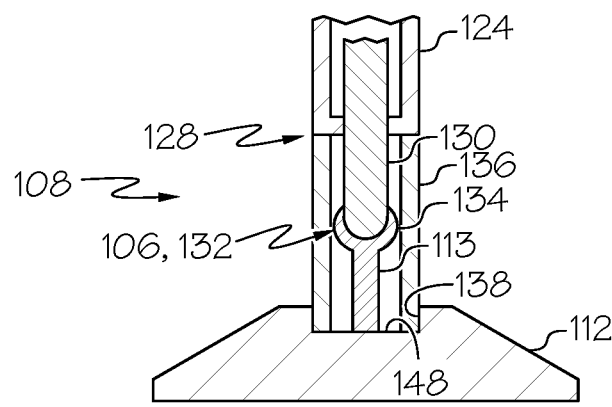
FIG. 7 is a schematic, elevation, sectional view of an example of portion of the monopodic surface preparation apparatus.

Referring to FIGS. 5-7, in an example, the lock 114 includes a seat 138 located on the base 112. When the linear actuator 102 is in the retracted position 108, the sleeve 136 engages the seat 138. Engagement between the sleeve 136 and the seat 138 automatically restricts pivotal movement of the linear actuator 102 relative to the base 112 by preventing articulation of the joint 134. Therefore, with the linear actuator 102 in the retracted position 108 and the sleeve 136 engaged with the seat 138, the monopodic surface preparation apparatus 100 is self-standing.

As illustrated in FIG. 5, in an example, the seat 138 is formed by a portion of the top surface of the base 112, such as a flat portion of the top surface surrounding the post 113. When the linear actuator 102 is in the retracted position 108, an end of the sleeve 136 is in contact with the seat 138. When the linear actuator 102 is in the retracted position 108, the rod 130, the joint 134, and the post 113 are received within the sleeve 136. The sleeve 136 has an inner dimension (e.g., inner diameter when the sleeve 136 takes the form of a cylindrical tube). The inner dimension of the sleeve 136 is nominally larger than a cross-sectional dimension of the joint 134 such that, when the linear actuator 102 is in the retracted position 108, the joint 134 is closely received within the sleeve 136 and the sleeve 136 restricts movement of the joint 134.

As illustrated in FIG. 6, in an example, the seat 138 includes, or takes the form of, a protrusion 146 that extends from the base 112. In an example, the post 113 extends from or forms a portion of the protrusion 146. When the linear actuator 102 is in the retracted position 108, the protrusion 146 is received within the sleeve 136. When the linear actuator 102 is in the retracted position 108, the rod 130, the joint 134, and the post 113 are also received within the sleeve 136. The protrusion 146 has a perimeter shape that is complementary to a cross-sectional shape of the sleeve 136, viewed along the longitudinal axis of the linear actuator 102. For example, the protrusion 146 has a cylindrical shape when the sleeve 136 takes the form of a cylindrical tube. The inner dimension of the sleeve is nominally larger than a cross-sectional dimension (e.g., diameter) of the protrusion 146 such that, when the linear actuator 102 is in the retracted position 108, the protrusion 146 is closely received within the sleeve 136 and the protrusion 146 restricts pivotal movement of the sleeve 136 relative to the base 112, thereby restricting movement of the joint 134.

As illustrated in FIG. 7, in an example, the seat 138 includes, or takes the form of, a recess 148 that depends from (e.g., is formed in) the base 112. In an example, the post 113 is located within the recess 148. When the linear actuator 102 is in the retracted position 108, the sleeve 136 is received within the recess 148. When the linear actuator 102 is in the retracted position 108, the rod 130, the joint 134, and the post 113 are received within the sleeve 136. The recess 148 has a perimeter shape that is complementary to the cross-sectional shape of the sleeve 136, viewed along the longitudinal axis of the linear actuator 102. For example, the recess has a cylindrical shape when the sleeve 136 takes the form of a cylindrical tube. An outer dimension of the sleeve is nominally smaller than a cross-sectional dimension (e.g., diameter) of the recess 148 such that, when the linear actuator 102 is in the retracted position 108, a portion of the sleeve 136 is closely received within the recess 148 and the base 112 restricts pivotal movement of the sleeve 136, thereby restricting movement of the joint 134.

Figure 8:
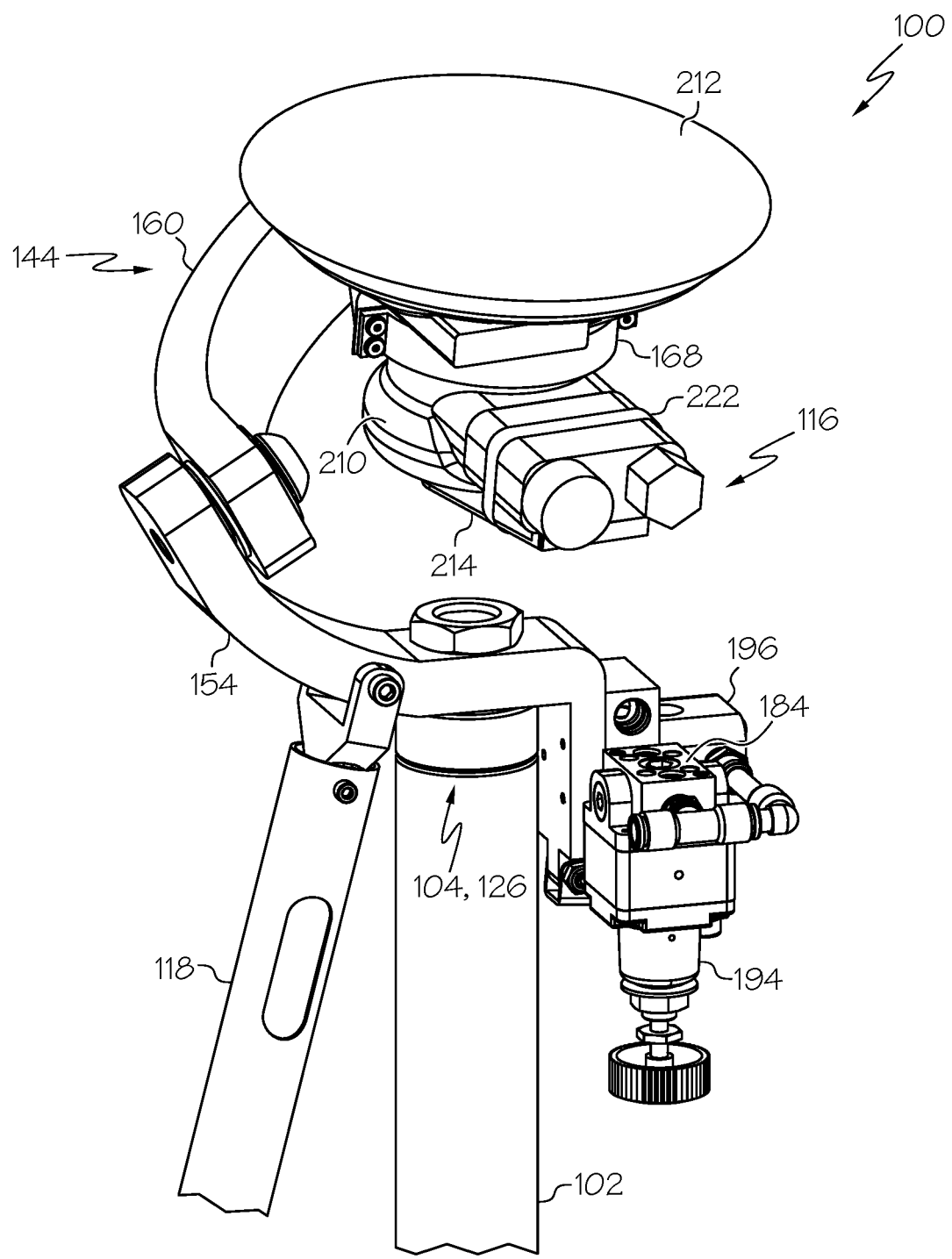
FIG. 8 is a schematic, perspective view of an example of a portion of the monopocis surface preparation apparatus.
Figure 9:
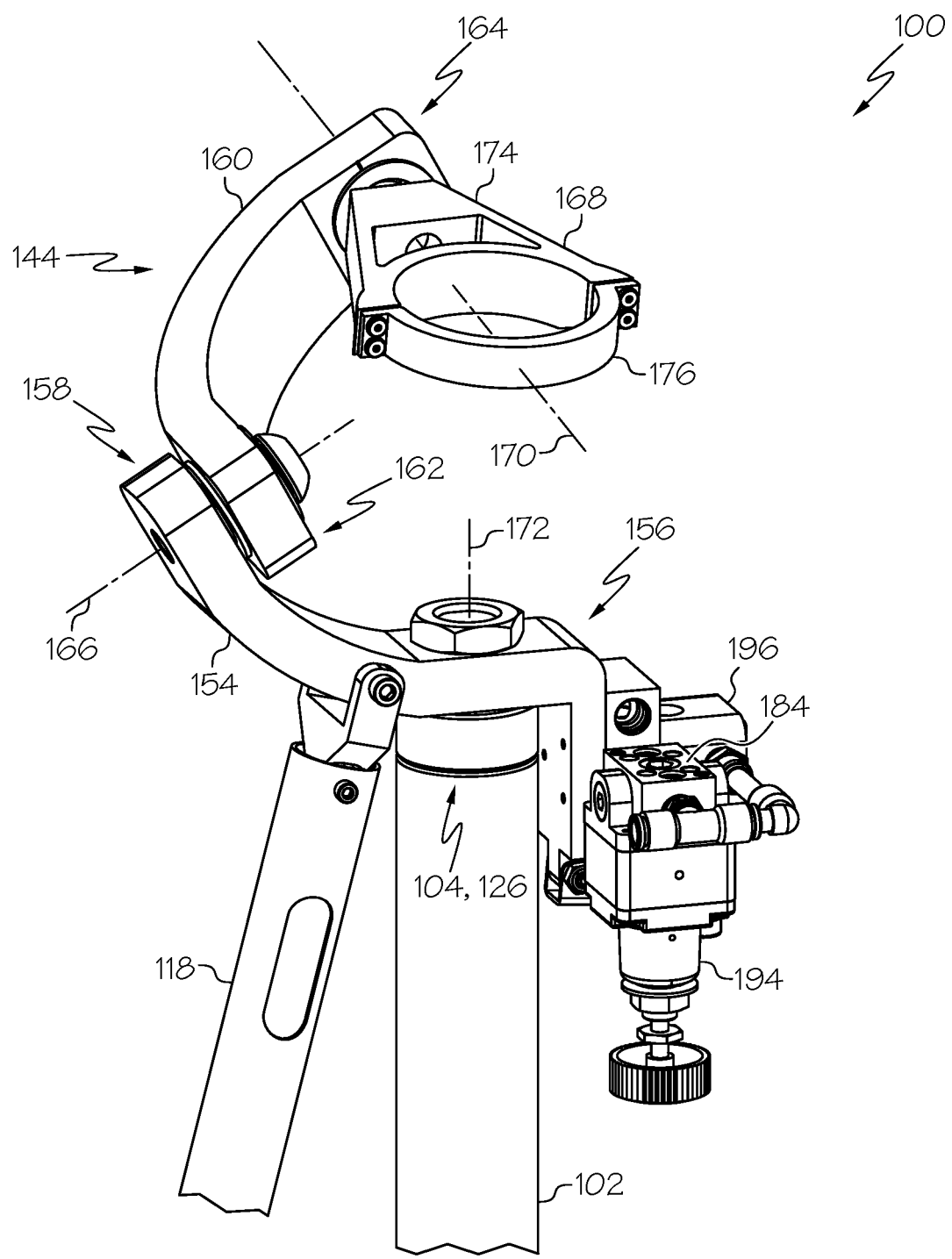
FIG. 9 is a schematic, perspective view of an example of a portion of the monopocis surface preparation apparatus.

Referring generally to FIGS. 1-4 and particularly to FIGS. 8 and 9, in an example, the monopodic surface preparation apparatus 100 includes a tool mount 144. The tool mount 144 is coupled to the tool-end 104 of the linear actuator 102. For example, the tool mount 144 is coupled to the cap-end 126 of the cylinder 124. The rotary surface preparation tool 116 is removably coupled to the tool mount 144. The rotary surface preparation tool 116 being removable from the tool mount 144 enables different types of rotary surface preparation tools (e.g., sanders, polishers, grinders, etc.) to be interchanged with each other depending on the particular surface preparation operation being performed. The tool mount 144 is configured to enable rotation of the rotary surface preparation tool 116. Rotation of the rotary surface preparation tool 116 enables the orientation of the rotary surface preparation tool 116 to be automatically adjusted to conform to a slope of a non-horizontal portion of the overhead-surface 202 (FIG. 1).

In an example, tool mount 144 enables rotation of the rotary surface preparation tool 116 about two axes (e.g., a first axis and a second axis). In an example, the two axes are orthogonal axes (i.e., are approximately perpendicular to each other). In an example, each of the two axes is approximately perpendicular to the longitudinal axis of the linear actuator 102. In an example, tool mount 144 also enables rotation of the rotary surface preparation tool 116 about a third axis. In an example, the third axis is parallel to the longitudinal axis of the linear actuator 102.

In an example, the tool mount 144 is a gimbal mechanism. In an example, the gimbal mechanism includes a set of (e.g., at least two) single axis gimbals. Each gimbal has a closed cross-sectional shape (e.g., a ring) and is independently moveable relative to each other and enables rotation of the rotary surface preparation tool 116 about one axis. In various examples, any suitable gimbal mechanism is contemplated for use as the tool mount 144.

In another example, the tool mount 144 (e.g., the gimbal mechanism) is a half-gimbal mechanism. The half-gimbal mechanism includes a set of (e.g., at least two) single axis gimbal arms. Each gimbal arm is independently moveable relative to each other and enables rotation of the rotary surface preparation tool 116 about one axis. Unlike a traditional gimbal mechanism, the gimbal arms of the half-gimbal mechanism do not require a closed cross-sectional shape in which an outer gimbal is concentric with an inner gimbal and each gimbal has two attachment points with an adjacent gimbal.

As illustrated in FIGS. 8 and 9, in an example, the tool mount 144 (e.g., the half-gimbal mechanism) includes a first arm 154 (e.g., a first gimbal arm). The first arm 154 includes a proximal end 156 and a distal end 158, opposite the proximal end 156 (FIG. 9). The proximal end 156 is coupled to the tool-end 104 of the linear actuator 102. For example, proximal end 156 of the first arm 154 is coupled to the cap-end 126 of the cylinder 124. The tool mount 144 also includes a second arm 160 (e.g., a second gimbal arm). The second arm 160 includes a proximal end 162 and a distal end 164, opposite the proximal end 162 (FIG. 9). The proximal end 162 of the second arm 160 is coupled to the distal end 158 of the first arm 154. The second arm 160 is rotatable relative to the first arm 154 about a roll axis 166 (FIG. 9). The tool mount 144 also includes a tool holder 168 (e.g., a third gimbal arm). The tool holder 168 is coupled to the distal end 164 of the second arm 160. The tool holder 168 is rotatable relative to the second arm 160 about a tilt axis 170 (also referred to as a pitch axis) (FIG. 9). The rotary surface preparation tool 116 removably coupled to the tool holder 168.

In an example, optionally, the first arm 154 is rotatable relative to the linear actuator 102 about a pan axis 172 (FIG. 9).

As illustrated in FIGS. 8 and 9, in an example, the control handle 118 is coupled to the tool mount 144 and is pivotal relative to the tool mount 144. For example, the control handle 118 is coupled to first arm 154 of the tool mount 144. In an example, the control handle 118 includes a clevis and a portion of the first arm 154 forms a tang that enables the control handle 118 to pivot relative to the first arm 154.

As illustrated in FIG. 9, in an example, the tool holder 168 includes an inner clamp member 174. The inner clamp member 174 is coupled to the distal end 164 of the second arm 160. The inner clamp member 174 is rotatable relative to the second arm 160 about the tilt axis 170. The tool holder 168 also includes an outer clamp member 176. The outer clamp member 176 is configured to be releasably coupled (e.g., fastened) to the inner clamp member 174. As illustrated in FIG. 9, the rotary surface preparation tool 116 is clamped between the inner clamp member 174 and the outer clamp member 176.

As illustrated in FIG. 8, in an example, the rotary surface preparation tool 116 includes a tool body 210 (e.g., a tool housing) and a rotary surface preparation head 212 coupled to the tool body 210. A motor (not shown), such as a pneumatic motor, is housed within the tool body 210 and is operatively coupled to the rotary surface preparation head 212 to drive the rotary surface preparation head 212. Structure and operation of rotary surface preparation tools and, particularly, pneumatic motors for driving rotary surface preparation heads are known and conventional and, therefore, will not be described in further detail.

As illustrated in FIGS. 8 and 9, the tool holder 168 is configured to be secured to the tool body 210 to couple the rotary surface preparation tool 116 to the second arm 160. In an example, the tool body 210 of the rotary surface preparation tool 116 is located within an open region defined between the inner clamp member 174 and the outer clamp member 176 (FIG. 9). When the inner clamp member 174 is coupled to the outer clamp member 176, the tool body 210 of the rotary surface preparation tool 116 is surrounded by and securely held between the inner clamp member 174 and the outer clamp member 176.

As illustrated in FIG. 8, in an example, the monopodic surface preparation apparatus 100 includes a strap 222. The strap 222 is coupled to (or is configured to be coupled to) the rotary surface preparation tool 116 and is configured to fix the rotary surface preparation tool 116 in an energized state. In an example, the rotary surface preparation tool 116 includes a switch 214. The switch 214 is located on the tool body 210 and is configured to energize or otherwise activate the rotary surface preparation tool 116 when engaged (e.g., when placed in an "on" position), such as by being manually depressed by a user (e.g., the operator 206). The strap 222 is coupled to tool body 210 of the rotary surface preparation tool 116 such that the strap 222 engages the switch 214 and secures the switch 214 in the fully energized position (e.g., "on" position). In an example, the strap 222 is configured to surround the tool body 210 and the switch 214. Upon the strap 222 being sufficiently tightened, the strap 222 depresses the switch 214 and holds the switch 214 in the depressed position. In an example, the strap 222 is a hook-and-loop strap (e.g., Velcro brand strap). In another example, the strap 222 is a zip tie (also commonly referred to as a cable tie). In other examples, the strap 222 include any one of various other releasably connectable straps or fasteners.

Figure 10:
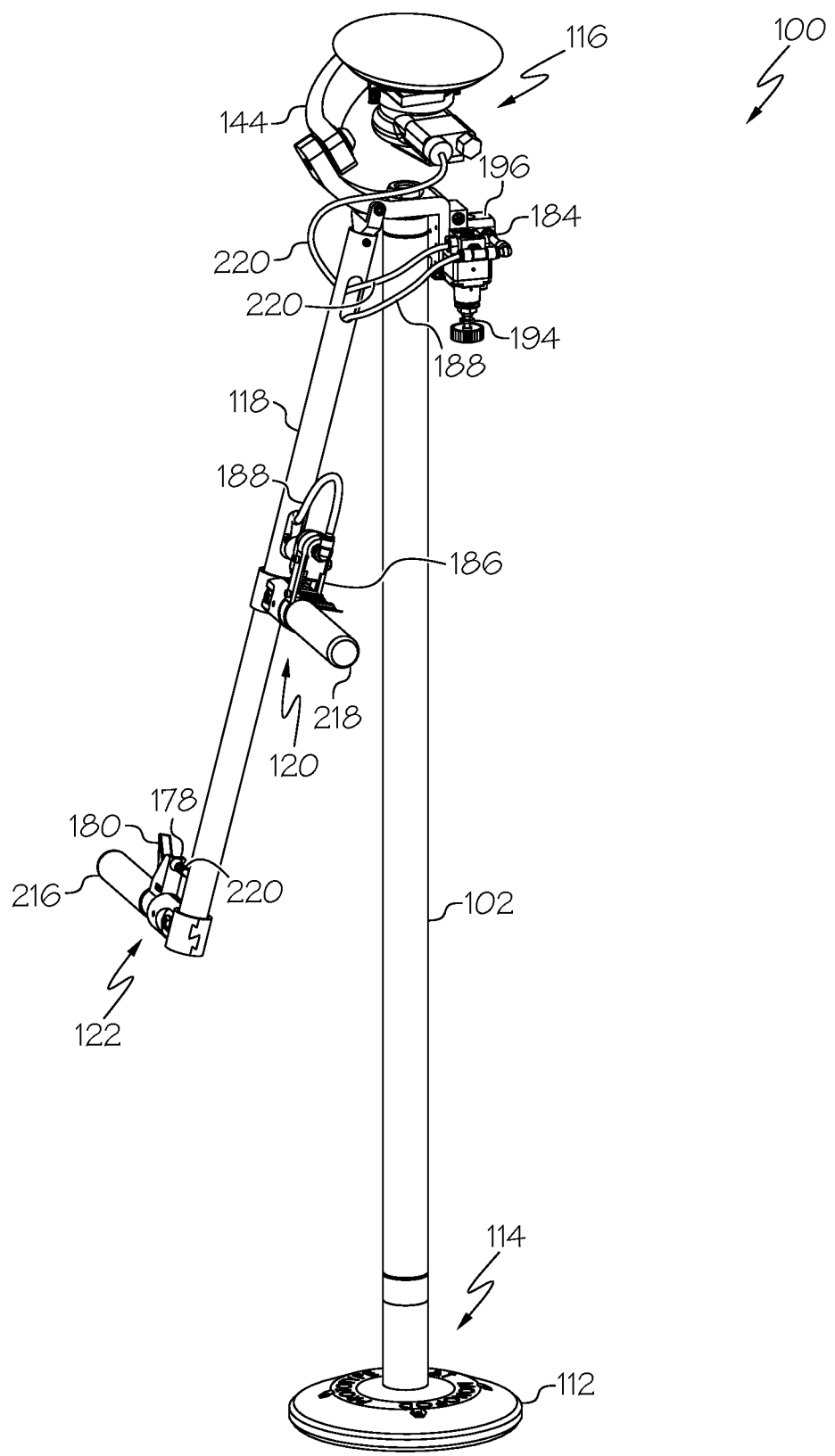
FIG. 10 is a schematic, perspective view of an example of the monopocis surface preparation apparatus.

Referring to FIGS. 10 and 11, in an example, the rotary surface preparation tool 116 is the pneumatic-powered tool and the linear actuator 102 is the pneumatic actuator. In such an example, the tool-controller 122 is a pneumatic tool-controller and the actuator-controller 120 is a pneumatic tool-controller. FIG. 11 schematically illustrates an example of a controls system 198 for the monopodic surface preparation apparatus 100 that is configured to control pressurized air supplied to the rotary surface preparation tool 116 and the linear actuator 102.

As illustrated in FIGS. 10 and 11, in an example in which the rotary surface preparation tool 116 is the pneumatic-powered tool, the tool-controller 122 includes a pneumatic tool-valve 178. The pneumatic tool-valve 178 is coupled to the rotary surface preparation tool 116 and is configured to be actuated between an open position to supply pressurized air to the rotary surface preparation tool 116 for energizing the rotary surface preparation tool 116 and a closed position to restrict pressurized air to the rotary surface preparation tool 116. The tool-controller 122 also includes a tool-handle lever 180 that is operably coupled with the pneumatic tool-valve 178. The tool-handle lever 180 is configured to selectively actuate the pneumatic tool-valve 178 between the open position and the closed position.

In an example, the pneumatic tool-valve 178 is a two-way, two position normally closed directional valve. The tool-handle lever 180 includes any suitable mechanical linkage that is operably coupled to the pneumatic tool-valve 178 such that movement of the tool-handle lever 180 actuates the pneumatic tool-valve 178, such as by being manually depressed by the operator 206 (FIG. 1) using one hand. Examples of the tool-handle lever 180 include a lever arm, a switch, a trigger, and the like.

As illustrated in FIG. 11, in an example, the tool-controller 122 includes a biasing mechanism 182 that is configured to bias the pneumatic tool-valve 178 in the closed position. In an example, the tool-handle lever 180 is moveable between an "on" position that actuates the pneumatic tool-valve 178 in the open position and an "off" position that actuates the pneumatic tool-valve 178 in the closed position. The biasing mechanism 182 is coupled to or is otherwise engaged with the tool-handle lever 180 such that the tool-handle lever 180 is biased in the "off" position. In an example, the biasing mechanism 182 is a spring.

In an example, when the tool-handle lever 180 is not being actively engaged (e.g., depressed) by the operator 206, the biasing mechanism 182 urges the tool-handle lever 180 in the "off" position and, thus, the pneumatic tool-valve 178 in the closed position, thereby automatically de-energizing the rotary surface preparation tool 116. In such an example, the tool-controller 122 acts as a deadman valve or switch that de-energizes the rotary surface preparation tool 116 at any point where an actuation force is not being applied to the tool-handle lever 180.

In an example, the pneumatic tool-valve 178 is configured to selectively adjust a flow rate of pressurized air to the rotary surface preparation tool 116. For example, the flow rate of pressurized air is proportionally adjusted in response to the amount of movement or the magnitude of the actuation force applied to the tool-handle lever 180.

Other examples and configurations of the tool-controller 122 are also contemplated depending, for example, on the type of rotary surface preparation tool 116 being used and particular manufacturing environment in which the surface preparation operation is being performed. As an example, the pneumatic tool-valve 178 may be a solenoid valve with an automatic return and an actuation switch. As another example, such as where the rotary surface preparation tool 116 is an electrically powered tool, the tool-controller 122 may include an electrical switch.

As illustrated in FIGS. 10 and 11, in an example in which the linear actuator 102 is the pneumatic actuator, the actuator-controller 120 includes a pneumatic actuator-valve 184. The pneumatic actuator-valve 184 is coupled to the linear actuator 102 and configured to be actuated between an open position to supply pressurized air to the linear actuator 102 for moving the linear actuator 102 to the extended position 110 and a closed position to restrict pressurized air to the linear actuator 102. The actuator-controller 120 also includes an actuator-handle lever 186 that is operably coupled with the pneumatic actuator-valve 184. The actuator-controller 120 is configured to selectively actuate the pneumatic actuator-valve 184 between the open position and the closed position.

In an example, when in the closed position, the pneumatic actuator-valve 184 is configured to exhaust pressurized air from the linear actuator 102 for passively moving the linear actuator 102 to the retracted position 108. For example, the linear actuator 102 is a single-acting linear actuator and the pneumatic actuator-valve 184 is a three way, two position normally closed directional valve. In such an example, passive retraction of the linear actuator 102 is accomplished by the force of gravity and/or by an internal spring of the linear actuator 102 acting on a piston to retract the rod 130 relative to the cylinder 124.

In an example, when in the closed position, the pneumatic actuator-valve 184 is configured to supply pressurized air to the linear actuator 102 for actively moving the linear actuator 102 to the retracted position 108. For example, the linear actuator 102 is a double-acting linear actuator and the pneumatic actuator-valve 184 is a four way, two position normally closed directional valve.

In an example, the actuator-handle lever 186 includes any suitable mechanical linkage that is operably coupled to the pneumatic actuator-valve 184 such that movement of the actuator-handle lever 186 actuates the pneumatic actuator-valve 184, such as by being manually depressed by the operator 206 (FIG. 1) using one hand. Examples of the actuator-handle lever 186 include a lever arm, a switch, a trigger, and the like.

As illustrated in FIG. 11, in an example, the actuator-controller 120 includes a transmission component 188 mechanically coupling the actuator-handle lever 186 and the pneumatic actuator-valve 184. This configuration enables the actuator-handle lever 186 and the pneumatic actuator-valve 184 to be spaced apart from each other. For example, as illustrated in FIG. 10, the actuator-handle lever 186 is located on the control handle 118 for manual operation by the operator 206 (FIG. 1) and the pneumatic actuator-valve 184 is located at the linear actuator 102. In an example, as illustrated in FIGS. 8 and 9, the pneumatic actuator-valve 184 is coupled to the proximal end 156 of the first arm 154 of the tool mount 144. The transmission component 188 transfers movement of the actuator-handle lever 186 into actuation of the pneumatic actuator-valve 184. In an example, the transmission component 188 is a cable connected to and extending between the actuator-handle lever 186 and the pneumatic actuator-valve 184.

As illustrated in FIG. 11, in an example, the pneumatic actuator-valve 184 includes a valve-control 190. The valve-control 190 is configured to selectively control actuation of the pneumatic actuator-valve 184 between the open position and the closed position. The transmission component 188 is coupled to the valve-control 190 such that pivotal movement of the actuator-handle lever 186 translates to movement of the valve-control 190 and actuation of the pneumatic actuator-valve 184.

The valve-control 190 includes any mechanism suitable to selectively control the operating positions of the pneumatic actuator-valve 184. Examples of the valve-control 190 include a lever, a knob, a trigger, a switch, and the like.

As illustrated in FIG. 11, in an example, the actuator-controller 120 includes a biasing mechanism 192 that is configured to bias the pneumatic actuator-valve 184 in the closed position. In an example, the actuator-handle lever 186 is moveable between an "on" position that actuates the pneumatic actuator-valve 184 in the open position via the valve-control 190 and an "off" position that actuates the pneumatic actuator-valve 184 in the closed position via the valve-control 190. The biasing mechanism 192 is coupled to or is otherwise engaged with the valve-control 190 such that the actuator-handle lever 186 is biased in the "off" position. In an example, the biasing mechanism 192 is a spring.

In an example, when the actuator-handle lever 186 is not being actively engaged (e.g., depressed) by the operator 206, the biasing mechanism 192 urges the actuator-handle lever 186 in the "off" position and, thus, the pneumatic actuator-valve 184 in the closed position, thereby automatically restricting flow of pressurized air to the linear actuator 102. In such an example, the actuator-controller 120 acts as a deadman valve or switch that restricts the flow of pressurized air to the linear actuator 102 at any point where an actuation force is not being applied to the actuator-handle lever 186.

As illustrated in FIGS. 10 and 11, in an example, the monopodic surface preparation apparatus 100 includes a pressure regulator 194. The pressure regulator 194 is configured to maintain pressurized air supplied to the linear actuator 102 at a substantially constant selected pressure. The pressure regulator 194 maintains the selected pressure that is applied by the rotary surface preparation tool 116 against the overhead-surface 202 substantially constant as the rotary surface preparation tool 116 is moving laterally across the overhead-surface 202 and pivoting about the tool-end 104 of the linear actuator 102 during operation of the monopodic surface preparation apparatus 100. The pressure regulator 194 regulates pressure in an air chamber of the cylinder 124 of the linear actuator 102 by equalizing pressure in the cylinder 124 when the rotary surface preparation tool 116 is contacting the overhead-surface 202 during operation of the monopodic surface preparation apparatus 100. Any one of various suitable types of pressure regulators may be used for the pressure regulator 194.

As illustrated in FIG. 11, in an example, the compressed air source 208 provides pressurized air in pneumatic lines 220 to an air inlet of the pneumatic tool-valve 178 of the tool-controller 122 and the pneumatic actuator-valve 184 of the actuator-controller 120. The flow of pressurized air that passes through the pneumatic tool-valve 178 along pneumatic lines 220 to the rotary surface preparation tool 116 is controlled by the position of the tool-handle lever 180 as selected by the operator 206. The flow of pressurized air that passes through the pneumatic actuator-valve 184 along pneumatic lines 220 to the linear actuator 102 is controlled by the position of the actuator-handle lever 186 as selected by the operator 206.

As illustrated in FIGS. 10 and 11, in an example, the monopodic surface preparation apparatus 100 includes a manifold 196. The manifold 196 is configured to direct pressurized air along pneumatic lines 220 to the linear actuator 102 via the pneumatic actuator-valve 184 and to the rotary surface preparation tool 116 via the pneumatic tool-valve 178.

Referring to FIGS. 1-4 and 8-10, in an example, the tool-handle lever 180 of the tool-controller 122 is located on the controller handle 118 such that it is manually operable using one hand of the operator 206 (FIG. 1) during use of the monopodic surface preparation apparatus 100. Similarly, the actuator-handle lever 186 of the actuator-controller 120 is located on the controller handle 118 such that it is manually operable using the other hand of the operator 206 (FIG. 1) during use of the monopodic surface preparation apparatus 100.

As illustrated in FIG. 10, in an example, the control handle 118 includes a tool-control handle 216 that extends from one side (e.g., left side) of the control handle 118 and an actuator-control handle 218 that extends from an opposing side (e.g., right side) of the control handle 118. The tool-control handle 216 and the actuator-control handle 218 enable the operator 206 (FIG. 1) to manipulate (e.g., raise and lower) the control handle 118 and to manipulate the pivotal position of the linear actuator 102 relative to the base 112 during a surface preparation operation using both hands, while independently operating the linear actuator 102 using one hand (e.g., right hand) and the rotary surface preparation tool 116 using the other hand (e.g., left hand).

As illustrated in FIG. 1, in an example, the operator 206 adjusts the height (e.g., raises and lowers) the rotary surface preparation tool 116 into contact with the overhead-surface 202 using the linear actuator 102 operated using one hand. With the rotary surface preparation tool 116 in contact with the overhead-surface 202, the operator 206 energizes the rotary surface preparation tool 116 using the other hand. With the rotary surface preparation tool 116 in contact with the overhead-surface 202, the operator 206 moves the rotary surface preparation tool 116 across the overhead-surface 202 by pivoting the linear actuator 102 relative to the base 112 using the control handle 118 operated using both hands.

In an example, the tool-control handle 216 and the actuator-control handle 218 are spaced apart from each other along a length of the control handle 118 to provide an ergonomic benefit to the operator 206. In an example, each one of the tool-control handle 216 and the actuator-control handle 218 is rotatable relative to the control handle 118 about a longitudinal axis of the control handle 118. Rotation of the tool-control handle 216 and the actuator-control handle 218 about the control handle 118 enables the operator 206 to selectively adjust which one of the tool-handle lever 180 and the actuator-handle lever 186 is operated by the left and right hands.

As best illustrated in FIGS. 1, 3, and 4, movement of the rod 130 into the extended position 110 (FIGS. 1 and 3) extends (e.g., raises) the cylinder 124 and, thus, the rotary surface preparation tool 116, the control handle 118, the actuator-controller 120, and the tool-controller 122 relative to the base 112, which is supported on the support-surface 204 of the manufacturing environment 200 (FIG. 1). Similarly, movement of the rod 130 into the retracted position 110 (FIG. 4) retracts (e.g., lowers) the cylinder 124 and, thus, the rotary surface preparation tool 116, the control handle 118, the actuator-controller 120, and the tool-controller 122 relative to the base 112. This configuration eliminates the need for pneumatic lines 220, such as those fluidly coupling the pneumatic tool-valve 178 to the rotary surface preparation tool 116, and the transmission component 188, mechanically coupling the actuator-handle lever 186 to the pneumatic actuator-valve 184, to have excess length sufficient to accommodate extension of the linear actuator 102. As illustrated in FIG. 10, in an example, the pneumatic line 220 connecting the manifold 196 to the pneumatic tool-valve 178, the pneumatic line 220 connecting to the rotary surface preparation tool 116, and the transmission component 188 connecting the actuator-handle lever 186 to the pneumatic actuator-valve 184 may extend through the control handle 118.

Figure 12:
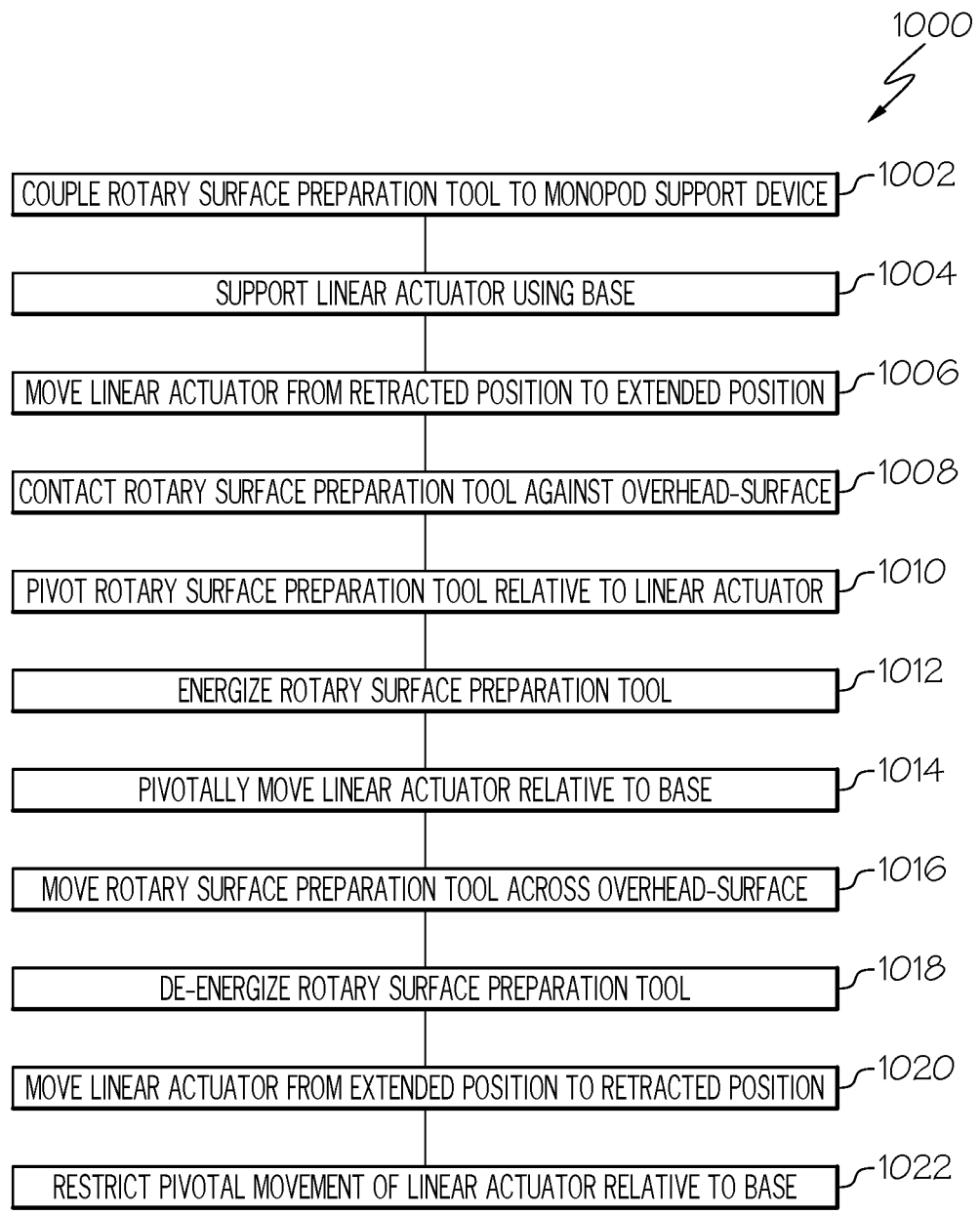
FIG. 12 is a flow diagram depicting an example of a disclosed method of preparing an overhead surface using the monopodic surface preparation apparatus.

Referring generally to FIGS. 1-11 and particularly to FIG. 12, examples of a method 1000 of preparing the overhead-surface 202 using the monopodic surface preparation apparatus 100 are disclosed. According to the method 1000, the monopodic surface preparation apparatus 100 is operated by the operator 206 and is used to perform a selected type of surface preparation operation. The type of surface preparation operation and/or the characteristics of the overhead-surface 202 may dictate the type of the rotary surface preparation tool 116 used. According to the method 1000, the monopodic surface preparation apparatus 100 includes monopod support device 150 that includes the linear actuator 102, the base 112, the lock 114, the tool mount 144, the control handle 118, the actuator-controller 120, and the tool-controller 122. The rotary surface preparation tool 116 is coupled to the monopod support device 150 using the tool mount 144.

Referring generally to FIGS. 10 and 11 and particularly to FIG. 12, in an example, the method 1000 includes a step of (block 1002) coupling the rotary surface preparation tool 116 to the monopod support device 150. In an example, the step of (block 1002) coupling the rotary surface preparation tool 116 to the monopod support device 150 includes a step of coupling the rotary surface preparation tool 116 to the tool-end 104 of the linear actuator 102 (e.g., the cap-end 126 of the cylinder 124) using the tool mount 144. The step of (block 1002) coupling the rotary surface preparation tool 116 to the monopod support device 150 includes a step of coupling the rotary surface preparation tool 116 to the tool-controller 122.

As illustrated in FIG. 11, in an example, the method 1000 includes a step of pressurizing the controls system 198 of the monopodic surface preparation apparatus 100 by coupling the monopodic surface preparation apparatus 100 to the compressed air source 208. In an example, the method 1000 also includes a step of selecting a pressure of pressurized air supplied to the linear actuator 102 using the pressure regulator 194.

Referring generally to FIGS. 1-4, 10, and 11 and particularly to FIG. 12, in an example, the method 1000 includes a step of (block 1004) supporting the linear actuator 102 on the support-surface 204 using the base 112 that is coupled to the base-end 106 of the linear actuator 102. The method 1000 also includes a step of (block 1006) moving the linear actuator 102 from the retracted position 108 to the extended position 110 using the actuator-controller 120. The method 1000 further includes a step of (block 1008) contacting the rotary surface preparation tool 116, coupled to the tool-end 104 of the linear actuator 102, against the overhead-surface 202. In other words, the linear actuator 102 is extended to adjust the height (e.g., raise) the rotary surface preparation tool 116 until the rotary surface preparation head 212 of the rotary surface preparation tool 116 is in contact with the overhead-surface 202. The rotary surface preparation tool 116 is maintained against the overhead-surface 202 with the substantially constant predetermined pressure using the pressure regulator 194.

Referring generally to FIGS. 1, 8, and 9, and particularly to FIG. 12, in an example, the method 1000 includes a step of (block 1010) pivotally moving the rotary surface preparation tool 116 relative to the linear actuator 102 using the tool mount 144 in response to the rotary surface preparation tool 116 contacting the overhead-surface 202. Pivotal movement of the rotary surface preparation tool 116 relative to the linear actuator 102, for example, about the roll axis 166 and/or the tilt axis 170 (FIG. 9), maintains the rotary surface preparation head 212 in constant contact with the overhead-surface 202. The method 1000 also includes a step of (block 1012), with linear actuator 102 in the extended position 110 and the rotary surface preparation tool 116 in contact with the overhead-surface 202, energizing the rotary surface preparation tool 116 using the tool-controller 122.

Referring generally to FIGS. 1-4 and particularly to FIG. 12, in an example, the method 1000 includes a step of (block 1014), with linear actuator 102 in the extended position 110 and the rotary surface preparation tool 116 in contact with the overhead-surface 202, pivotally moving the linear actuator 102 relative to the base 112 using the control handle 118. The method 1000 also includes a step of (block 1016) moving the rotary surface preparation tool 116 across the overhead-surface 202 in response to pivotal movement of the linear actuator 102 relative to the base 112.

Referring generally to FIGS. 1-4, 10, and 11 and particularly to FIG. 12, in an example, the method 1000 includes a step of (block 1018) de-energizing the rotary surface preparation tool 116 using the tool-controller 122. In an example, the rotary surface preparation tool 116 is automatically de-energized when the operator removes the actuation force applied to the tool-controller 122, such as by releasing the tool-handle lever 180.

Referring generally to FIGS. 1-4, 10, and 11 and particularly to FIG. 12, in an example, the method 1000 includes a step of (block 1020) moving the linear actuator 102 from the extended position 110 to the retracted position 108 using the actuator-controller 120. In an example, the linear actuator 102 is automatically retracted when the operator removes the actuation force applied to the actuator-controller 120, such as by releasing the actuator-handle lever 186.

Referring generally to FIGS. 1-4, 10, and 11 and particularly to FIG. 12, in an example, the method 1000 includes a step of (block 1022), with the linear actuator 102 in the retracted position 108, restricting pivotal movement of the linear actuator 102 relative to the base 112 using the lock 114. In an example, the lock 114 holds the linear actuator 102 in an upright (e.g., vertical) position relative to the base 112 when the linear actuator 102 in moved to the retracted position 108.

Figure 13:
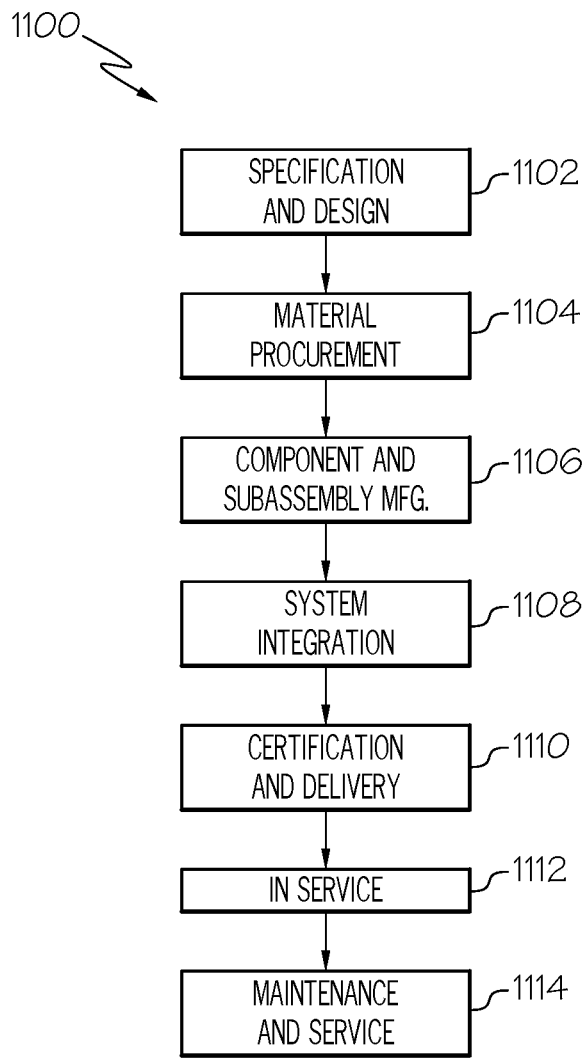
FIG. 13 is a flow diagram of an aircraft manufacturing and service methodology.
Figure 14:
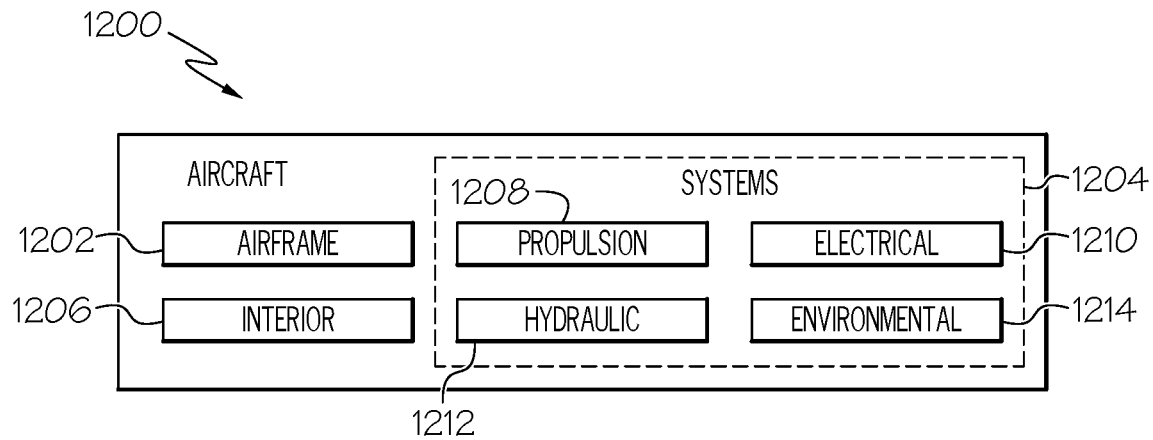
FIG. 14 is a block diagram of an aircraft.

Examples of the monopodic surface preparation apparatus 100 and the method 1000 disclosed herein may find use in a variety of potential applications, particularly in the transportation industry, including for example, aerospace applications. Referring now to FIGS. 13 and 14, examples of the monopodic surface preparation apparatus 100 and the method 1000 may be used in the context of an aircraft manufacturing and service method 1100, as shown in the flow diagram of FIG. 13 and the aircraft 1200, as shown in FIG. 14. Aircraft applications may include preparing at least one overhead surface, such as an underwing structure, of the aircraft 1200.

FIG. 14 is an illustrative example of the aircraft 1200. The aircraft 1200 includes an airframe 1202, a plurality of high-level systems 1204, and an interior 1206. Examples of the high-level systems 1204 include one or more of a propulsion system 1208, an electrical system 1210, a hydraulic system 1212, and an environmental system 1214. In other examples, the aircraft 1200 may include any number of other types of systems. The aircraft 1200 illustrated in FIG. 14 is an example of an aircraft having one or more overhead surfaces that are prepared using the monopodic surface preparation apparatus 100 and/or according to the method 1000 disclosed herein.

As illustrated in FIG. 13, during pre-production, the method 1100 may include specification and design of aircraft 1200 (block 1102) and material procurement (block 1104). During production of the aircraft 1200, component and subassembly manufacturing (block 1106) and system integration (block 1108) of the aircraft 1200 may take place. Thereafter, the aircraft 1200 may go through certification and delivery (block 1110) to be placed in service (block 1112). Implementation of the monopodic surface preparation apparatus 100 and the method 1000 may form a portion of component and subassembly manufacturing (block 1106) and/or system integration (block 1108). Routine maintenance and service (block 1114) may include modification, reconfiguration, refurbishment, etc. of one or more systems of the aircraft 1200.

Each of the processes of the method 1100 illustrated in FIG. 13 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the monopodic surface preparation apparatus 100 and the method 1000 shown or described herein may be employed during any one or more of the stages of the manufacturing and service method 1100 shown in the flow diagram illustrated by FIG. 13. For example, overhead surfaces, such as belonging to underwing structures of the aircraft 1200, corresponding to component and subassembly manufacturing (block 1106) may be prepared in a manner similar to components or subassemblies prepared while the aircraft 1200 (FIG. 14) is in service (block 1112). Also, one or more examples of the monopodic surface preparation apparatus 100 and the method 1000 described herein may be utilized during system integration (block 1108) and certification and delivery (block 1110). Similarly, one or more examples of the monopodic surface preparation apparatus 100 and the method 1000 described herein may be utilized, for example and without limitation, while the aircraft 1200 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to other vehicle structures (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy. For example, the term "approximately" refers to a condition that is within 10% of the stated condition. However, the term "approximately" does not exclude a condition that is exactly the stated condition.

In FIGS. 11 and 13, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-11, referred to above, need be included in every example and not all elements described herein are necessarily depicted in each illustrative example. Unless otherwise explicitly stated, the schematic illustrations of examples depicted in FIGS. 1-11, referred to above, are not meant to imply structural limitations with respect to the illustrative example. Rather, although one illustrative structure is indicated, it is to be understood that the structure may be modified when appropriate.

In FIGS. 12 and 13, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 12 and 13 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the monopodic surface preparation apparatus 100 and the method 1000 have been shown and described, modifications may occur to those skilled in the art upon reading the specification. The present application includes such modifications and is limited only by the scope of the claims.

What is claimed is:

1. A monopodic surface preparation apparatus comprising:
    a linear actuator comprising a tool-end and a base-end, wherein the linear actuator is moveable between a retracted position and an extended position;
    a joint coupled to the base-end of the linear actuator;
    a base coupled to the joint, wherein the linear actuator is pivotally moveable relative to the base when the linear actuator is in the extended position;
    a sleeve coupled to the linear actuator, wherein the joint is received within the sleeve to restrict articulation of the joint and pivotal movement of the linear actuator relative to the base when the linear actuator is in the retracted position;
    a rotary surface preparation tool coupleable to the tool-end of the linear actuator, wherein the rotary surface preparation tool is linearly moveable using the linear actuator and is pivotally moveable relative to the linear actuator;
    a control handle coupled to the linear actuator and configured to pivot the linear actuator relative to the base when the linear actuator is in the extended position;
    an actuator-controller coupled to the control handle and configured to selectively actuate the linear actuator; and
    a tool-controller coupled to the control handle and configured to selectively energize the rotary surface preparation tool.

2. The monopodic surface preparation apparatus of claim 1, wherein the linear actuator further comprises:
    a cylinder comprising a cap-end and a rod-end, wherein the cap-end of the cylinder defines the tool-end of the linear actuator; and
    a rod extending from the rod-end of the cylinder and comprising a working-end, wherein the working-end defines the base-end of the linear actuator and the rod is moveable relative to the cylinder between the retracted position and the extended position.

3. The monopodic surface preparation apparatus of claim 1, further comprising a seat located on the base,
wherein the sleeve engages the seat when the linear actuator is in the retracted position.

4. The monopodic surface preparation apparatus of claim 3, wherein:
the seat comprises a protrusion extending from the base; and
the protrusion is received within the sleeve when the linear actuator is in the retracted position.

5. The monopodic surface preparation apparatus of claim 3, wherein:
the seat comprises a recess depending from the base; and
the sleeve is received within the recess when the linear actuator is in the retracted position.

6. The monopodic surface preparation apparatus of claim 1, further comprising a tool mount coupled to the tool-end of the linear actuator; and wherein:
the rotary surface preparation tool is removably coupled to the tool mount; and
the tool mount is configured to enable rotation of the rotary surface preparation tool about two axes.

7. The monopodic surface preparation apparatus of claim 6, wherein:
the tool mount comprises:
a first arm having a proximal end, coupled to the linear actuator, and a distal end;
a second arm having a proximal end, coupled to the distal end of the first arm, and a distal end, wherein the second arm is rotatable relative to the first arm about a roll axis;
a tool holder coupled to the distal end of the second arm, wherein the tool holder is rotatable relative to the second arm about a tilt axis; and
the rotary surface preparation tool removably coupled to the tool holder.

8. The monopodic surface preparation apparatus of claim 7, wherein:
the tool holder comprises:
an inner clamp member coupled to the distal end of the second arm, wherein the inner clamp member is rotatable relative to the second arm about the tilt axis; and
an outer clamp member configured to be releasably coupled to the inner clamp member; and
the rotary surface preparation tool is clamped between the inner clamp member and the outer clamp member.

9. The monopodic surface preparation apparatus of claim 1, further comprising a strap coupled to the rotary surface preparation tool and configured to fix the rotary surface preparation tool in an energized state.

10. The monopodic surface preparation apparatus of claim 1, wherein:
the rotary surface preparation tool is a pneumatic-powered tool; and
the tool-controller comprises:
a pneumatic tool-valve coupled to the rotary surface preparation tool and configured to be actuated between an open position to supply pressurized air to the rotary surface preparation tool for energizing the rotary surface preparation tool and a closed position to restrict pressurized air to the rotary surface preparation tool; and
a tool-handle lever operably coupled with the pneumatic tool-valve and configured to selectively actuate the pneumatic tool-valve between the open position and the closed position.

11. The monopodic surface preparation apparatus of claim 10, wherein the tool-controller further comprises biasing mechanism configured to bias the pneumatic tool-valve in the closed position.

12. The monopodic surface preparation apparatus of claim 1, wherein:
the linear actuator is a pneumatic actuator; and
the actuator-controller comprises:
a pneumatic actuator-valve coupled to the linear actuator and configured to be actuated between an open position to supply pressurized air to the linear actuator for moving the linear actuator to the extended position and a closed position to restrict pressurized air to the linear actuator; and
an actuator-handle lever operably coupled with the pneumatic actuator-valve and configured to selectively actuate the pneumatic actuator-valve between the open position and the closed position.

13. The monopodic surface preparation apparatus of claim 12, wherein the actuator-controller further comprises a transmission component mechanically coupling the actuator-handle lever and the pneumatic actuator-valve.

14. The monopodic surface preparation apparatus of claim 12, wherein the actuator-controller further comprises biasing mechanism configured to bias the pneumatic actuator-valve in the closed position.

15. The monopodic surface preparation apparatus of claim 12, wherein, when in the closed position, the pneumatic actuator-valve is configured to exhaust pressurized air from the linear actuator for passively moving the linear actuator to the retracted position.

16. The monopodic surface preparation apparatus of claim 12, wherein, when in the closed position, the pneumatic actuator-valve is configured to supply pressurized air to the linear actuator for actively moving the linear actuator to the retracted position.

17. A monopodic surface preparation apparatus comprising:
a linear actuator comprising a tool-end and a base-end, wherein the linear actuator is moveable between a retracted position and an extended position;
a joint coupled to the base-end of the linear actuator;
a base coupled to the joint, wherein the base is configured to support the linear actuator and the linear actuator is pivotally moveable relative to the base when the linear actuator is in the extended position;
a tool mount coupled to the tool-end of the linear actuator, wherein a rotary surface preparation tool is coupleable to the tool mount;
a sleeve coupled to the linear actuator, wherein the joint is received within the sleeve to restrict articulation of the joint and pivotal movement of the linear actuator relative to the base when the linear actuator is in the retracted position;
a control handle coupled to the linear actuator and configured to pivot the linear actuator relative to the base when the linear actuator is in the extended position;
an actuator-controller coupled to the control handle and operatively coupled to the linear actuator, wherein the actuator-controller is configured to selectively actuate the linear actuator; and
a tool-controller coupled to the control handle and operatively coupleable to the rotary surface preparation tool, wherein the tool-controller is configured to selectively energize the rotary surface preparation tool.

18. A method of preparing an overhead-surface using a monopodic surface preparation apparatus, the method comprising:
supporting a linear actuator of the monopodic surface preparation apparatus on a support-surface using a base coupled to a base-end of the linear actuator by a joint;
moving the linear actuator from a retracted position to an extended position using an actuator-controller;
contacting a rotary surface preparation tool, coupled to a tool-end of the linear actuator, against the overhead-surface;
with the linear actuator in the extended position and the rotary surface preparation tool in contact with the overhead-surface, energizing the rotary surface preparation tool using a tool-controller;
with the linear actuator in the extended position and the rotary surface preparation tool in contact with the overhead-surface, pivotally moving the linear actuator relative to the base about the joint;
de-energizing the rotary surface preparation tool using the tool-controller;
moving the linear actuator from the extended position to the retracted position using the actuator-controller; and
with the linear actuator in the retracted position, restricting pivotal movement of the linear actuator relative to the base by receiving the joint within a sleeve, coupled to the linear actuator, to restrict articulation of the joint.

19. The monopodic surface preparation apparatus of claim 17, further comprising a seat located on the base, wherein the sleeve engages the seat when the linear actuator is in the retracted position.

20. The monopodic surface preparation apparatus of claim 17, wherein:
the tool mount comprises:
a first arm having a proximal end, coupled to the linear actuator, and a distal end;
a second arm having a proximal end, coupled to the distal end of the first arm, and a distal end, wherein the second arm is rotatable relative to the first arm about a roll axis;
a tool holder coupled to the distal end of the second arm, wherein the tool holder is rotatable relative to the second arm about a tilt axis; and
the rotary surface preparation tool removably coupleable to the tool holder.

* * * * *